Aug. 1, 1933.  F. D. BARLING  1,920,457
CONVEYER STAIRS
Filed March 7, 1931
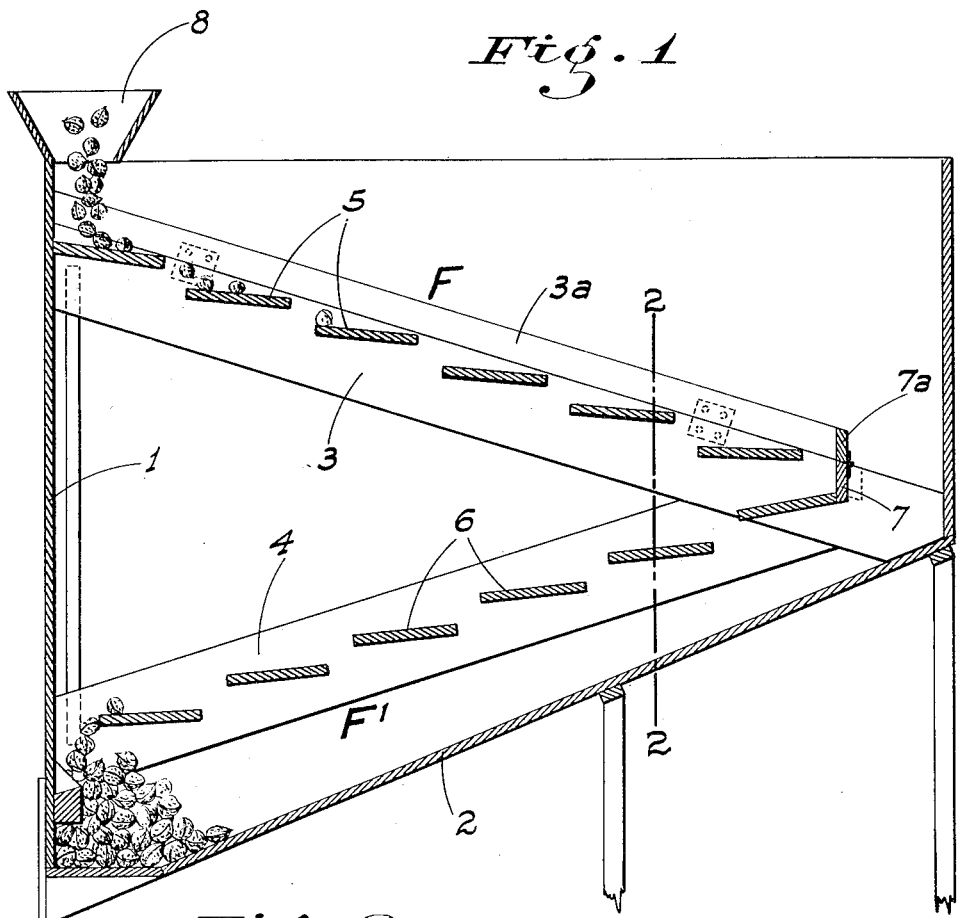
Fig. 1
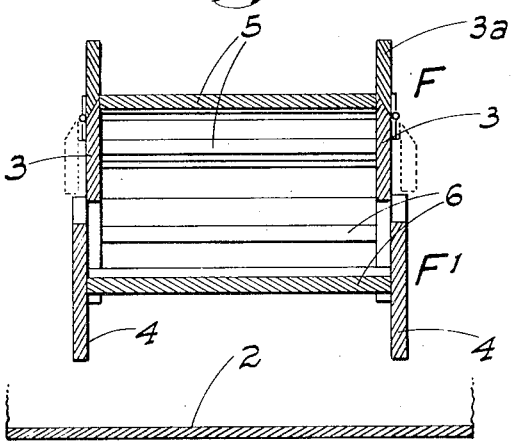
Fig. 2
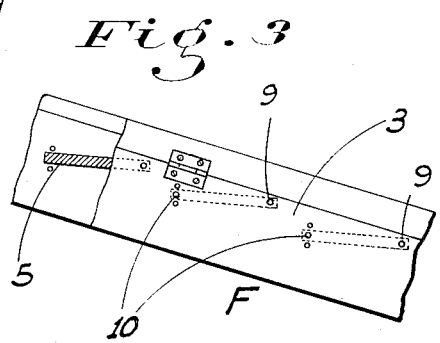
Fig. 3
INVENTOR
F. D. Barling
BY
ATTORNEY Patented Aug. 1, 1933

1,920,457

UNITED STATES PATENT OFFICE 1,920,457

CONVEYER STAIRS

Frank D. Barling, Linden, Calif.

Application March 7, 1931. Serial No. 520,906

2 Claims. (Cl. 193—28)

This invention relates to conveyers for bulk materials, and especially to one of a type used to discharge certain products into a storage bin—an operation which is performed from the top of the bin.

I have particularly in mind the handling of walnuts and like products, which if allowed to drop any considerable distance are apt to crack open and of course they then lose most of their market value. To avoid this breaking, conveying devices have been used, which consist of vertical chutes depending into the bin nearly to the bottom of the same and which are provided with step or staggered platforms arranged to break the fall of the nuts as they are dumped into the chute. Such devices, however, dispose the nuts in the bottom of the bin over a relatively small area which is soon filled and the chute, of course, becomes choked. It is then necessary for a worker to enter the bin and shovel the nuts away from the mouth or discharge end of the chute in order to permit the structure to continue to function. Even then it is, of course, practically impossible to completely fill the bin unless the conveyer is raised at intervals as the bin fills. With such an apparatus, therefore, the filling of a bin is a slow and relatively costly procedure.

The principal object of my invention is to avoid these objectionable features by providing a conveyer for the purpose, by means of which not only are the nuts as discharged on to the upper end of the same prevented from dropping an excessive distance and being broken as they are disposed in the bin, but the bin may fill up more or less evenly of itself without any manual attention being necessary. The conveyer is also arranged so that it may be used as a stairway for a person entering the bin, as must sometimes be done.

Also, with the ordinary type of bin conveyer or catch screen arrangement, the outlet from the bin is choked and the flow of products therefrom badly retarded. My improved conveyer avoids this objectionable feature.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a sectional elevation of my improved conveyer stairs as mounted in a bin.

Fig. 2 is a cross-section on the line 2—2 of Fig. 1.

Fig. 3 is a fragmentary side elevation of the conveyer showing the adjustable mounting of the platforms.

Referring now more particularly to the characters of reference on the drawing, the bin 1 in which the conveyer is shown as being used, is of an ordinary open-topped type used for storage purposes, the bottom 2 of the bin having an upward slope toward the back.

The conveyer in the arrangement shown consists of upper and lower flights F and F'. The upper flight includes transversely spaced side boards 3, which extend with a downward slope from the front of the bin adjacent the top to the back of the bin adjacent its junction with the bottom.

The lower flight includes side boards 4, extending from adjacent the inner-most end of the boards 3 in overlapping relation thereto, to the front end of the bin in substantially parallel and spaced relation to the bottom of the same.

Between and supported by the boards 3 is a plurality of platforms 5 which are horizontal in a transverse plane and are spaced apart both in horizontal and vertical planes so that they are disposed in stepped relation. All the platforms are set with a downward slope toward the back end of the flight, but the slope of the upper-most platform is slightly greater than that of the majority, while the slope of the inner-most and lowest platform is slightly less.

Similarly disposed and spaced platforms 6 extend between the boards 4 of the lower flight, the downward slope of the platforms 6 being, of course, in the direction of the slope of the side boards 4, or toward the front of the bin. In this platform arrangement the upper-most platform has a greater slope than the majority and the lowest one a lesser slope. The upper-most platform 6 is below and projects rearwardly of the adjacent platform 5; a vertical transverse baffle board 7 extending between the side boards from said platform 6 to a level above that of said platform 5. If desired, the upper portion 7a of this baffle may be hinged so as to be folded down and back. Similarly the upper portions 3a of the side boards 3 above the level of the platforms 5 may be hinged so as to fold over and down.

The upper-most platform 5 abuts against the front wall of the bin and is directly under an intake hopper 8 into which the nuts to be binned are initially dumped. The nuts are caught by said upper-most platform and from there roll on to the successive platforms. The slope of the platforms is such that the momentum of the nuts prevents them from dropping between the spaced platforms, while at the same time they do not get excessive speed. The slope of the upper-most platform being relatively greater, the nuts are given a certain starting speed; while the slope of the lower-most platform being relatively smaller, the speed of the nuts is there slackened so that they do not strike the baffle board with excessive force.

The baffle board deflects the nuts from the lower-most platform 5 on to the adjacent upper-most platform 6 of the lower flight. The nuts then roll successively on to and along the various platforms of said flight until they drop off the lower-most one (if the bin is empty) into the bottom of the bin, which is relatively close to the conveyer, so that the drop is a short one.

As the piles of nuts in the bin accumulate and reach the level of the lower-most platform 6, the latter ceases to discharge and becomes practically covered with the nuts. The nuts then pass for the time being between said platform and the adjacent one, until the level of the nuts in the bin has been raised to that of said adjacent platform. This operation is continued until the bin has been filled to the level of the upper flight and the lower flight has been completely buried. The nuts then act in the same manner along the upper flight to fill the remainder of the bin. An even distribution of the nuts and a rapid discharge of the same is aided when the level of the nuts in the bin reaches that of the upper flight by lowering the upper portions 3a of the side boards 3. This enables the nuts to flow over the sides of the conveyer as the latter becomes heaped up and practically buried.

If desired, to enable the structure to be successfully used for products of different rolling tendencies, I may pivot the various platforms in a fixed position at one end as shown at 9 in Fig. 3, and provide for vertical adjustment at the opposite end, as indicated at 10. The slope of the platform is thus altered to compensate for different rolling tendencies of different products.

While I have here shown and described a conveyer as being disposed as within a nut-receiving bin, it is obvious that it is not necessarily used in a bin or for nuts, since it is suitable to convey any mass products of a lumpy or rollable nature. It is also obvious that the conveyer may be made as a single flight or with more than two flights, depending upon the character of service to which it is to be put and to the conditions under which it must operate.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A conveyer structure including spaced side boards having a downward slope from one end to the other, and platforms extending between and supported by said boards in stepped relation from the upper to the lower ends thereof, the platforms being disposed on a slope in the same direction as but less than that of the boards and being disposed below the upper edges of the side boards, and means mounting the portions of said boards above the platforms in a manner to enable them to be lowered relative to the platforms.

2. A conveyer for filling a bin comprising the combination with the bin, a flights of platforms; the platforms of each flight being substantially parallel to each other and arranged in steplike formation with their adjacent ends spaced apart both vertically and horizontally to form spaces therebetween, said spaces opening freely into the bin but being of such width that objects flowing over the flight while capable of dropping through the spaces, will normally move from platform to platform without falling through such spaces; the topmost platform of each flight being set on a slope greater than that of the remainder to give initial impetus to the objects deposited on said platform while the lowest platform of each flight is set on a slope less than that of the other platforms to slacken the speed of the objects.

FRANK D. BARLING.